US009149969B2

(12) United States Patent
Handschuh et al.

(10) Patent No.: US 9,149,969 B2
(45) Date of Patent: Oct. 6, 2015

(54) DEVICE FOR FORMING PLASTIC PREFORMS INTO PLASTIC CONTAINERS AND BLOW MOULD CARRIER

(71) Applicant: KRONES AG, Neutraubling (DE)

(72) Inventors: Eduard Handschuh, Donaustauf (DE); Florian Geltinger, Donaustauf (DE); Michael Neubauer, Uebersee (DE); Thomas Philipp, Eilsbrunn (DE); Klaus Voth, Obertraubling (DE)

(73) Assignee: KRONES AG (DE)

( * ) Notice: Subject to any disclaimer, the term of this patent is extended or adjusted under 35 U.S.C. 154(b) by 0 days.

(21) Appl. No.: 14/486,613

(22) Filed: Sep. 15, 2014

(65) Prior Publication Data

US 2015/0079212 A1 Mar. 19, 2015

(30) Foreign Application Priority Data

Sep. 13, 2013 (DE) .......................... 10 2013 015 093

(51) Int. Cl.
*B29C 49/48* (2006.01)
*B29C 49/38* (2006.01)
(Continued)

(52) U.S. Cl.
CPC ................. *B29C 49/38* (2013.01); *B29C 49/28* (2013.01); *B29C 49/36* (2013.01); *B29C 49/46* (2013.01); *B29C 49/48* (2013.01); *B29C 49/56* (2013.01); *B29C 49/64* (2013.01); *B29C 49/06* (2013.01); *B29C 49/12* (2013.01); *B29C 49/4823* (2013.01); *B29C 2049/4697* (2013.01); *B29C 2049/4874* (2013.01); *B29C 2049/566* (2013.01); *B29K 2995/0063* (2013.01); *B29L 2031/712* (2013.01)

(58) Field of Classification Search
CPC ................. B29C 2049/4874; B29K 2995/063; B29K 2995/0077; B29K 2995/0063
See application file for complete search history.

(56) References Cited

U.S. PATENT DOCUMENTS 7,341,443 B2 * 3/2008 Lemaistre et al. ............ 425/540
RE41,572 E 8/2010 Briere et al. .................. 425/195
(Continued)

FOREIGN PATENT DOCUMENTS

DE 102008038141 2/2010 ................ A61L 2/06
DE 10 2010 039 802 3/2012 ............. B29C 49/48
(Continued)

OTHER PUBLICATIONS

German Search Report issued in corresponding German Patent Appln. No. 10 2013 015 093.0 dated May 14, 2014 (8 pgs).
(Continued)

*Primary Examiner* — Robert B Davis
(74) *Attorney, Agent, or Firm* — Hayes Soloway P.C.

(57) ABSTRACT

Apparatus for forming plastic preforms into plastic containers, with at least one blowing station arranged on a moving carrier, wherein the blowing station has a blow mould carrier for holding a blow mould and the blow mould carrier has a first blow mould carrier part and a second blow mould carrier part, wherein the second blow mould carrier part can be moved away from the first blow mould carrier part in order to open the blow mould for removal of a plastic container and/or for insertion of a preform, and wherein the second blow mould carrier part can be moved towards the first blow mould carrier part in order to transfer the blow mould into a closed state for forming the preform, wherein that the second blow mould carrier part has a lower density and/or strength than the first blow mould carrier part.

15 Claims, 5 Drawing Sheets

(51) Int. Cl.
*B29C 49/36* (2006.01)
*B29C 49/46* (2006.01)
*B29C 49/56* (2006.01)
*B29C 49/28* (2006.01)
*B29C 49/64* (2006.01)
*B29C 49/06* (2006.01)
*B29C 49/12* (2006.01)
*B29L 31/00* (2006.01)

(56) References Cited

U.S. PATENT DOCUMENTS

| | | | |
|---|---|---|---|
| 8,641,409 B2 | 2/2014 | Hollriegl et al. | 425/522 |
| 2011/0133369 A1 | 6/2011 | Martini et al. | 264/523 |
| 2012/0052146 A1 | 3/2012 | Hollriegl et al. | 425/523 |
| 2012/0261865 A1 | 10/2012 | Neubauer et al. | 264/523 |

FOREIGN PATENT DOCUMENTS

| | | | |
|---|---|---|---|
| EP | 2422953 | 2/2012 | B29C 49/42 |
| EP | 2 511 070 | 10/2012 | B29C 49/46 |
| JP | H04101813 | 4/1992 | B29C 33/38 |
| WO | WO 2010/020529 | 2/2010 | B29C 49/36 |
| WO | WO 2010020159 | 2/2010 | G06F 9/50 |

OTHER PUBLICATIONS

Extended European Search Report (w/o translation) issued in application No. 14184723.6, dated Feb. 1, 2015 (4 pgs).

* cited by examiner

DEVICE FOR FORMING PLASTIC PREFORMS INTO PLASTIC CONTAINERS AND BLOW MOULD CARRIER

BACKGROUND OF THE INVENTION

The present invention relates to an apparatus for forming plastic preforms into plastic containers and a blow mould carrier. Such devices has been known for some time in the prior art. Normally, plastic preforms are formed into plastic containers by pressurization with compressed air in a plurality of blowing stations. As part of the expansion process, a number of successive movement processes take place. Normally the blow mould carrier halves are pivoted apart for insertion of a plastic preform and then pivoted together in order to perform the expansion process. After the end of the expansion process, the blow mould carrier parts are pivoted apart again to be able to remove the finished blown plastic container. When the blow mould carrier parts are in the closed state, in particular during the expansion process, in addition the blow mould carrier parts are locked together in order to be able to withstand the not inconsiderable pressures. Normally a pressure pad mechanism is arranged on one of the two blow mould carrier parts in order, for the duration of the prevailing interior pressure in the blowing process, to press the two blow moulds arranged on the blow mould carrier parts together with greater force than that provoked by the blowing pressure. Thus visible joint seams on the containers produced are kept as small as possible.

Furthermore sterile applications are known from the prior art in which the individual blowing stations are conducted inside a clean room. For example WO 2010/020529 A2 describes an apparatus for forming plastic preforms into plastic containers, which has a transport device comprising several blowing stations and a clean room.

By means of the clean room, aseptic conditions can be guaranteed in the production of the plastic containers and also during their filling with drinks.

The subject of WO 2010/020529-A2 is hereby made fully the subject of the present disclosure by reference.

As stated above, an important component of a blowing station is the locking mechanism which connects or locks the two mould carrier halves together during the blowing process. After the end of the blowing process, the lock opens. After opening the mould, the bottle can be removed and a new preform inserted. In the prior art, these locking mechanisms normally have a locking shaft mounted in one of the two mould carriers. Several bearing points distributed over the height of the mould carrier guarantee an even force distribution in the components. This is important since the lock must withstand a holding force of several 10,000 N. The locking process consists for example of a rotary or linear movement of the lock. This movement is normally generated by a stationary curve attached to the base structure of the machine, and transferred to the locking shaft via various deflections.

The opening and closing movement of the mould carrier is independent of this and controlled separately. Control takes place via a stationary control curve. For complete control therefore two curves are required, one to control the two mould carrier halves and one to control the lock.

It may also be necessary to provide a tempering of the blow moulds and/or the blow mould carrier shells in order to cool or heat the plastic surface quickly on expansion.

It has been found that the two blow mould carrier parts are subject to different requirements.

For example it is possible that asymmetric opening of the blow mould carrier parts offers kinematic advantages, in order to be able to insert the preforms in the blow mould gently (for the preform and control curves of the blow mould and the transfer stars for insertion and removal). If for this, one blow mould carrier part must be pivoted further than the other, the forces on the one are higher.

Furthermore a blow mould carrier part must resist the above-mentioned pressure pad mechanism, which again makes this heavier.

Furthermore it is possible to pivot the above-mentioned locking mechanism with the blow mould carrier parts. This locking mechanism normally has moving parts (e.g. a rotatable hook) which must be held by at least one blow mould carrier part, which again makes this heavier, while the other blow mould carrier part need merely provide a surface to create a form fit for the moving parts of the other (e.g. a groove to receive the hook).

It is therefore desirable to adapt the blow mould carrier parts of a blowing station to the different requirements, in particular with regard to the kinematics and weight.

SUMMARY OF THE INVENTION

An apparatus according to the invention for forming plastic preforms into plastic containers comprises at least one blowing station arranged on a moving carrier, wherein this blowing station has a blow mould carrier for holding a blow mould and this blow mould carrier has a first blow mould carrier part and a second blow mould carrier part, wherein the second blow mould carrier part can be moved away from the first blow mould carrier part in order to open the blow mould for removal of a plastic container and/or for insertion of a preform, and wherein the second blow mould carrier part can be moved towards the first blow mould carrier part in order to transfer the blow mould into a closed state for forming the preform.

According to the invention, the second blow mould carrier part has a lower density and/or strength than the first blow mould carrier part.

By the individual selection of densities of the materials or the actual materials from which the blow mould carrier parts are made, various functions can be distributed on the two blow mould carrier parts as required.

The density ratio of the second to the first blow mould carrier part lies in particular in a range from 0.2 to 0.6, preferably between 0.3 and 0.45.

The density of the second blow mould carrier part lies in particular in a range between 2 and 4 $kg/dm^3$, and that of the first blow mould carrier part between 7 and 9 $kg/dm^3$.

The strength ratio of the second to the first blow mould carrier part lies in particular in a range from 0.5 to 0.95, preferably between 0.7 and 0.9.

The tensile strength of the second blow mould carrier part lies in particular between 440 and 520 $N/mm^2$ (Rm), and that of the first blow mould carrier part between 480 and 850 $N/mm^2$.

In particular the second blow mould carrier part consists substantially of an aluminium alloy and the first blow mould carrier part of a steel alloy, in particular a stainless steel.

In particular the aluminium alloy consists of at least 51% aluminium atoms, further alloy constituents can be amongst others zinc, magnesium and/or copper. It is also conceivable to provide manganese or nickel as further constituents of the alloy. The aluminium alloy is in particular not susceptible to corrosion even on contact with sterilisation or cleaning agents.

The steel and the stainless steel consist of at least 51% iron atoms. For stainless steel, for example conventional stainless steel known as 1.4301 can be used.

The use of stainless steel and corrosion-resistant aluminium alloy is advantageous in particular for applications in the clean room since normally the surfaces of the clean room regularly come into contact with aggressive cleaning agents.

It would however also be conceivable to make one blow mould carrier part, in particular the second, from different materials, in which case the density is determined by the total mass divided by total volume.

The containers can be preforms, bottles, cans, kegs, syringes, pouches or similar. Normally a blow mould carrier part holds a blow mould half, wherein these can be moved together. A blow mould half is normally shaped as a side contour of a bottle—the mouth piece of the bottle and the base are not normally parts of this contour. Between a blow mould carrier part and a blow mould half, further intermediate shells can be placed such as mould carrier shells (normally forming the contact surface for the pressure pad and mounted moveably on the blow mould carrier) or master moulds (normally used for tempering or holding moulds of non-standard diameter) or insulating shells. In a possible configuration, viewed from the innermost bottle, the following arrangement is possible in this order: blow mould half, master mould half, mould carrier shell, blow mould carrier part. The mould carrier shell is here arranged normally only on one side e.g. on the first blow mould carrier part. On the second side then the configuration is as follows: blow mould half, master mould half, blow mould carrier part.

It is however also conceivable that the contour of the container to be produced can be made directly in the blow mould carrier and/or the mould carrier shell. In this case a blow mould can be omitted.

Blow mould carrier parts are parts which in closed state of a blow mould are arranged furthest to the outside viewed from the container.

Furthermore it is also possible for the density or material of at least one of the shells associated with the second blow mould carrier part (blow mould half, master mould half, mould carrier shell) to be selected smaller. In view of thermal expansion on tempering of the blow mould however, both blow mould halves are advantageously made of the same material with the same density, in particular an aluminium alloy.

In particular the mass of the second blow mould carrier part is less than that of the first blow mould carrier part. This is suitable if different kinematic requirements are imposed since, for example for opening, a lower acceleration force is required on one side than on the other. In other words, the curves or drives which must apply the acceleration forces can achieve different accelerations of the individual blow mould carrier parts under the same maximum force.

The mass ratio of the second blow mould carrier part to the first lies in particular in a range from 0.1 to 0.5, preferably between 0.15 and 0.35.

The mass of the second blow mould carrier part lies in particular in a range from 10 to 20 kg, and that of the first blow mould carrier part in a range from 40 to 70 kg. Both masses are given without attachments (bolts etc.).

In particular the total density, and particularly also the total mass, of all parts arranged on the second blow mould carrier part (bolts, shells) which are moved with this part, including the second blow mould carrier part, is lower than the density of the first blow mould carrier part including all parts arranged on the first blow mould carrier part.

In particular a distance travelled during the opening movement by the second blow mould carrier part is greater than a distance travelled by the first blow mould carrier part. The distance travelled can for example be determined from the mass or volume centre of gravity of the parts. In particular it must be noted that this also includes a blow mould carrier part which is fixed (not moving) in relation to the carrier.

On a pivoting opening of the blow mould carrier parts or a blow mould carrier part, a pivot angle covered during the opening movement by the second blow mould carrier part can be greater than a pivot angle covered by the first blow mould carrier part. This also includes the case where the first blow mould carrier part is fixed.

In particular, for the further distance and angle, the difference is at least 5%, preferably at least 15%, even more preferably at least 25%.

In particular the second blow mould carrier part is pivotable in relation to the first blow mould carrier part about a first predefined pivot axis, and the first blow mould carrier part is pivotable in relation to the second blow mould carrier part about a second predefined pivot axis, and the first blow mould carrier part is pivotable through a first predefined pivot angle and the second blow mould carrier part is pivotable through a second predefined pivot angle, and in a fully open state of the blow mould carrier parts the second pivot angle is greater, in particular by more than 10°, than the first pivot angle. The fully open state is given in particular in the region of removal of the container from the blow mould.

In particular both blow mould carrier parts are pivotable about a common axis i.e. the first pivot axis and second pivot axis are arranged coaxially to each other.

It would however also be conceivable to provide the first and second pivot axes spaced apart.

In particular a pressure pad mechanism is present only in the first blow mould carrier part. This mechanism is known as "compensation". This mechanism requires for example a relative mobility of the (first) blow mould half (and where applicable the further intermediate shells) in relation to the first blow mould carrier part, which in turn means that additional bearings, and where applicable a mould carrier shell on which these bearings are mounted, must be arranged on the first blow mould carrier part, which again increases the weight. Furthermore a pressure pad normally comprises an annular seal which lies on the inside of the blow mould carrier and the outside of the next inner shell, in particular the carrier shell. Compressed air (up to 40 bar) is introduced into this seal in order to press the next shell away from the blow mould carrier part and against the parts of the other blow mould carrier part. For this additionally a compressed air connection must be provided on the first blow mould carrier part, which is connected to a compressed air supply via a connecting line. This connection is implemented more easily if the distance or angle covered on opening is kept small. Also very high forces occur which must also be resisted by the first blow mould carrier part, so it is advantageous if this has a higher density or strength.

In particular, moving parts of a locking mechanism for locking the first blow mould carrier part against the second blow mould carrier part are arranged only on the first blow mould carrier part. With this arrangement, the loads on the bearings can be absorbed by the blow mould carrier part with higher density or strength. Also the higher weight can be placed on the blow mould carrier part with the smaller distance or angle.

In particular the locking mechanism comprises a first locking element arranged at least indirectly on the first blow mould carrier part and a second locking element arranged at least indirectly on the second blow mould carrier part, wherein in a locked state of the blow mould carrier parts, the locking elements cooperate, wherein at least the first locking element is moveable about a second predefined axis in relation to the carrier, wherein the pivot movement of the first blow mould carrier part and the movement of the first locking element are coupled together by means of a coupling device such that for at least part of the time during a movement of the first locking element about the second predefined axis, the second predefined axis moves in relation to the carrier in a direction standing perpendicular to the second axis.

In particular the apparatus has a clean room separated from an environment by at least one wall, within which at least the blow mould carrier parts and shells are moved.

In particular the first blow mould carrier part, or the blow mould half arranged on the first blow mould carrier part, or an intermediate shell between the blow mould half and blow mould carrier part, is connected to a tempering medium connection via at least one, preferably two (feed and return) flexible line(s), and the second blow mould carrier part is supplied with tempering medium in particular via lines, wherein the lines are arranged in a pivot axis associated with this blow mould carrier part. In particular the lines are bores in the pivot axis, wherein the pivot axis turns with the second blow mould carrier part on the opening and closing movement.

In particular, no carrier shell is arranged on the second blow mould carrier part since no pressure pad is present on this side of the mould carrier.

An at least indirect arrangement of the respective locking element on the blow mould carrier part means that this locking element is arranged e.g. directly on the respective blow mould carrier part or is arranged for example on a further element or component which is stationary (fixed) in relation to the respective other blow mould carrier part. Thus one locking element can be arranged fixedly in relation to the carrier and its associated blow mould carrier part can also be arranged fixedly in relation to the carrier.

It is conceivable that one locking element is arranged rigidly in relation to the respective blow mould carrier part and the other is moveable e.g. pivotable in a defined manner. Advantageously however at least one locking element is arranged directly on its associated blow mould carrier part, and particularly preferably both locking elements are arranged on their associated blow mould carrier parts.

In a further advantageous embodiment, the second predefined axis is a pivot axis and the first locking element is pivotable in relation to this second pivot axis which is preferably arranged stationary in relation to the first blow mould carrier part.

Advantageously, said first locking element—which, as mentioned above, is advantageously arranged pivotable about this (pivot) axis—moves with said pivot axis. Advantageously the moving carrier is a rotatable carrier, such as for example a blowing wheel. In a further advantageous embodiment, a plurality of such blowing stations are arranged on this carrier.

In a further advantageous embodiment, the first locking element is moveable along the axis. In this embodiment, the first locking element could be a rod-like or bolt-like body which is displaced in its longitudinal direction in order for example to engage in corresponding recesses or sleeve-like bodies for the purpose of locking.

In a further advantageous embodiment, the coupling device which couples the (pivot) movement of the first blow mould carrier part and the first locking element together is a mechanical coupling device, i.e. both said pivot movements and the displacement movements are mechanically coupled together. Thus advantageously the pivot movement of the locking element and the pivot movement of the first blow mould carrier part are coupled together by a common mechanism.

In a further advantageous embodiment, the apparatus has a clean room separated from its environment by at least one wall, within which the blow mould carrier or where applicable the entire blowing station is moved. This embodiment is relevant in particular for an aseptic blowing machine in which the blowing station is transported within said clean room. In an advantageous embodiment, the clean room is formed at least partly by said carrier. The carrier can thus advantageously have a C-shaped outer profile within which the individual blowing stations are arranged at least partly. Advantageously said coupling device is arranged outside the clean room, for example below the clean room.

In a further advantageous embodiment, the second blow mould carrier part is pivotable about a predefined pivot axis. In a particularly advantageous embodiment, the first mould carrier part and second mould carrier part are pivoted about a common geometric axis. It would however also be possible for the pivot axis about which the first blow mould carrier part is pivoted to be parallel to the pivot axis about which the second blow mould carrier part is pivoted. Advantageously these pivot axes run parallel to a longitudinal direction of the plastic preform to be expanded.

In most known blowing machines, in particular stretch-blowing machines, both mould carrier halves are opened (pivoted) by around the same angle for removal of the bottle or insertion of the plastic preform. However it can sometimes also be useful to make the necessary opening movement of the mould carriers (greatly) asymmetric. In this case, which is preferred here, one mould carrier half pivots substantially further than the other. Advantageously the two mould carrier halves are controlled or driven separately.

So that the blow mould can be opened asymmetrically and advantageously, the movement of the first blow mould carrier part serves merely to release a base part of the blow mould, and the movement of the second blow mould carrier part serves to remove the plastic container. Advantageously the first blow mould carrier part is pivoted through an angle which lies between 1° and 10°, preferably between 1° and 8°, preferably between 2° and 7°, and particularly preferably between 3° and 6°.

Preferably the locking shaft is mounted on or in the blow mould carrier part which is pivoted through the smaller angle. After closing of the two mould halves, this shaft must execute a rotation movement and thus lock the two blow mould carriers.

Advantageously the second blow mould carrier part is pivoted through an angle which lies between 20° and 60°, preferably between 30° and 50°, preferably between 35° and 45°, and particularly preferably around 40°. Advantageously a pivot shaft defining the pivot axis extends through a wall which in particular delimits the clean room, and the movements of the pivot shaft are particularly preferably sealed by means of a sealing device.

To this end, said wall advantageously has a passage opening through which the pivot shaft extends. The pivot shaft is advantageously not only rotatable in relation to this opening but also moveable perpendicular to said axis. Advantageously the sealing device is arranged firstly on the shaft and secondly on said wall. The sealing device is advantageously able to absorb both rotary movements through a predefined angle and also (displacement) movements of the pivot shaft in a direction standing perpendicular to the pivot shaft. Advantageously the sealing device is made of a plastic. Advantageously the pivot shaft is moveable in relation to the carrier along a curved path.

In a further advantageous embodiment, the coupling device has a lever for pivoting the blow mould carrier part in relation to the second pivot axis. This lever advantageously extends at least partly in a direction perpendicular to the pivot shaft. For example a curve roller can be arranged on this lever and can cooperate with a guide curve which is in particular arranged stationary.

However other drive types would also be conceivable, such as for example electric motors, pneumatic drives, hydraulic drives and similar.

In a further advantageous embodiment, the coupling device has a lever arm which is arranged rotationally fixedly on a pivot shaft defining the pivot axis and is connected articulatedly with a further pivot arm. This articulated configuration allows a coupling between the pivot movement of the locking element and the displacement movement of the pivot shaft or pivot axis itself, in particular along a circular track.

Advantageously therefore the pivot shaft for the locking mechanism is moved along a circular track, wherein this circular track in turn results from the pivot movement of a first blow mould carrier part.

The invention is also directed at a blow mould carrier for holding a blow mould, comprising a first blow mould carrier part and a second blow mould carrier part, wherein the second blow mould carrier part can be moved away from the first blow mould carrier part in order to open the blow mould for removal of a plastic container and/or insertion of a preform, and wherein the second blow mould carrier part can be moved towards the first blow mould carrier part in order to transfer the blow mould into a closed state for forming the preform.

According to the invention, the second blow mould carrier part has a lower density and/or strength than the first blow mould carrier part.

The fact that one blow mould carrier part, in the present case the second, can temper a blow mould half directly, can also be regarded as a separate invention.

This offers the advantage that no further shells are required in-between. This correlation can also be utilised for the other blow mould carrier part. As a whole then one side of a blow mould carrier consists of precisely two main parts (excluding bolts etc.): a blow mould carrier part and a blow mould, wherein only the blow mould carrier part is tempered (i.e. cooled or heated).

In particular this is achieved by the use of an aluminium alloy as a material of the blow mould carrier part, since aluminium has a high thermal conductivity.

BRIEF DESCRIPTION OF THE DRAWINGS

The drawings show further advantages and embodiments in which.

DETAILED DESCRIPTION OF THE INVENTION

Figure 1:
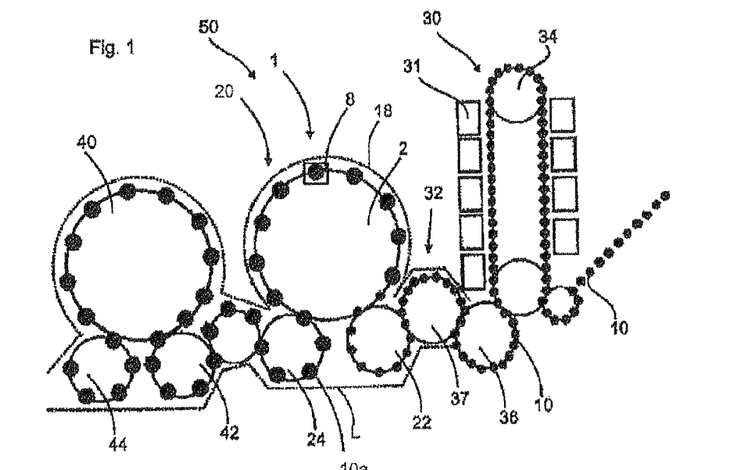
FIG. 1 is a diagrammatic depiction of a plant for production of plastic containers.

FIG. 1 shows a diagrammatic depiction of a plant for production of plastic containers. This plant 50 has a heating device 30 in which the plastic preforms 10 are heated. These plastic preforms 10 are conducted through this heating device 30 by means of a transport device 34, here a circulating chain, and heated by a plurality of heating elements 31. The heating device 30 is followed by a delivery unit 36 which delivers the preforms 10 to a sterilisation device 32. This sterilisation device also has a transport wheel 37 and sterilisation elements can be arranged on this transport wheel 37 or also stationary. In this region sterilisation takes place for example using hydrogen peroxide gas or electromagnetic radiation. In particular an internal sterilisation of the preforms is carried out in this region.

Reference numeral 20 as a whole designates a clean room, the outer limits of which are here indicated by a dotted line L. In a further preferred embodiment, the clean room 20 is arranged not only in the region of the transport wheel 2 and filling device 40, but may begin as early as the region of the heating device 30, the sterilisation device 32, the plastic preform supply and/or the plastic preform production. It is evident that this clean room 20 begins in the region of the sterilisation unit 32. In this region, lock devices can be provided for insertion of the plastic preforms in the clean room 20 without too much gas flowing into the clean room and being lost.

As indicated by the dotted line L, the clean room is adapted to the outer form of the individual plant components. In this way the volume of the clean room can be reduced.

Reference numeral 1 as a whole designates a forming apparatus in which a plurality of blowing stations or forming stations 8 is arranged on a transport wheel 2, wherein here only one of these blowing stations 8 is shown. The blowing stations 8 expand the plastic preforms 10 into containers 10*a*. Although not shown here in detail, the clean room 20 does not contain the entire area of the transport device 2, but the clean room 20 or isolator is to a certain extent configured as a mini-isolator within the entire apparatus. Thus it would be possible for the clean room to be designed as a channel at least in the region of the forming apparatus 1.

Reference numeral 22 refers to a supply device which delivers the preforms to the forming apparatus 1, and reference numeral 24 to a discharge device which discharges the produced plastic containers 20 from the forming apparatus 1. It is evident that in the region of the supply device 22 and discharge device 24, the clean room 20 has recesses which hold these devices 22, 24. In this way, the plastic preforms 10 can be delivered to the forming apparatus 1, or the plastic containers 10*a* can be removed from the forming apparatus 1, in a particularly advantageous manner.

A delivery unit 42 delivers the expanded plastic containers to a filling device 40, and these containers are then discharged from this filling device 40 via a further transport unit 44. The filling device 40 lies inside said clean room 20. Also in the case of the filling device, it would be possible that the clean room 20 does not contain the entire filling device 40 with for example a reservoir for a drink, but here only those regions in which the containers are actually guided. To this extent the filling device could be constructed in a similar manner to the apparatus 1 for forming plastic preforms 10.

As stated, in the region of the apparatus 1, the clean room 20 is reduced to the smallest possible region, namely essentially the blowing stations 8 themselves. This compact design of the clean room 20 makes it easier and quicker to create a clean room, and maintaining the sterile conditions in the operating phase is less complex. Also less sterile air is required, which leads to smaller filtering plants and reduces the risk of uncontrolled eddying.

Figure 2:
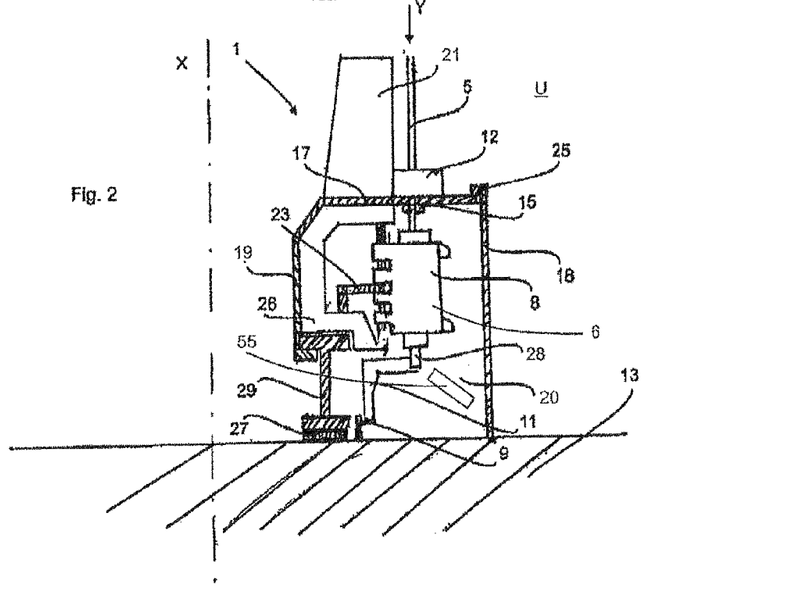
FIG. 2 is a view of a clean room in the region of a blowing station.

FIG. 2 shows a detailed depiction of the apparatus 1 in the region of a blowing station 8. A plurality of such blowing stations 8 is moved with a transport device 2 or carrier in rotation about an axis X. The blowing station 8, as shown in FIG. 2, is conducted within the clean room 20 which is here formed as a channel. This clean room 20 is closed by a moveable side wall 19 and a cover 17 formed integrally with this side wall 19. The side wall 19 and cover 17 rotate with the blowing station 8.

Reference numeral 18 refers to a further wall which delimits the clean room 20. This wall 18 here is an external wall which is arranged stationary. Between the cover 17 and the wall 18, a sealing device 25 is provided which seals against each other the elements 17 and 18 which are movable in relation to each other, for example as stated above using a water lock. The lower region of the wall 18 is fixed and arranged sealed to a base 13. Inside the clean room 20, and here lying directly on the wall 19, a carrier 26 is provided which is also moved in rotation and on which in turn a holding device 23 is provided which holds the blowing station 8.

Reference numeral 11 refers to a follower device which can be activated by the guide curve 9 in order to open and close the blowing station on its way through the clean room 6, in particular for placing the plastic preform in the blowing station and removing it again. A guide curve 9 is also arranged inside the clean room 20. It would however also be possible to guide a portion 11 below the individual blowing stations 8 outside the clean room 20.

The transport device 2 can have further elements which are arranged above the clean room 20.

The carrier 26 is arranged fixedly on a holding body 29 and this holding body is in turn moveable in relation to the base 13. Reference numeral 27 refers to a further sealing device which in this area causes a seal of regions 13 and 29 which are movable in relation to each other.

Reference numeral 5 refers to a stretching rod which is moveable in relation to the blowing station in order to stretch the plastic preforms 10 in their longitudinal direction. Here a cradle 12 is arranged on the cover 17, and the stretching rod is movable in direction Y in relation to this cradle. Reference numeral 21 refers to a further holder for this cradle 12 of the stretching rod 5.

It is evident that during the blowing process, certain regions of the stretching rod lie both outside the clean room 20 and inside the clean room 20. To this end it is possible to provide a protective device such as folding bellow outside the clean room 20 or above the cradle 12, surrounding the stretching rod 5, so that no part of the stretching rod 5 comes into direct contact with the external environment. Reference symbol U designates the (non-sterile) environment of the clean room 20. Reference numeral 28 designates a carrier for carrying a base mould which also forms part of the blow mould 4. This carrier is here also moveable in direction Y.

Reference numeral 55 refers to a sterilisation device which is here preferably arranged inside the clean room 20 and serves to sterilise the individual forming stations or elements of these forming stations 8. This sterilisation device 55 can here bombard the forming stations 8 with hydrogen peroxide for example or another sterilisation agent. The sterilisation device 55 can be arranged stationary and the forming stations can move in relation to this sterilisation device 55. This sterilisation device or bombardment device 55 can also be located on the transport wheel 2 or on the standing wall 18, or generally be arranged stationary, and consist of nozzles or similar. Also it is advantageous to introduce sterile air into the clean room 20 via the ventilation system for sterilising the clean room 20.

The blow moulds (not shown) are arranged inside the blow mould carrier 6. More precisely, two blow mould carrier parts can be arranged which are pivotable in relation to each other and each hold a blow mould part. With this pivot process, the blow moulds can be opened for insertion of plastic preforms and removal of finished blown containers. These blow mould carriers and blow moulds are also arranged inside the clean room.

It would however be possible (in contrast to FIG. 2) and preferable for the transport device 2 or the carrier to have a C-shaped outer periphery which also partially forms the outer walls of the clean room. Thus this C-shaped clean room wall rotates with the transport device 2 i.e. the blowing wheel. In this embodiment, the lower limit of the clean room is spaced from the base 13 and moves relative to the base. In this way the clean room can be configured even smaller than shown in FIG. 2. A seal of this C-shaped profile of the transport device, which here forms both an inner wall and lower and upper cover of the clean room, is here preferably only provided in relation to the outer wall of the clean room. This outer wall is here advantageously arranged stationary.

Figure 3A:
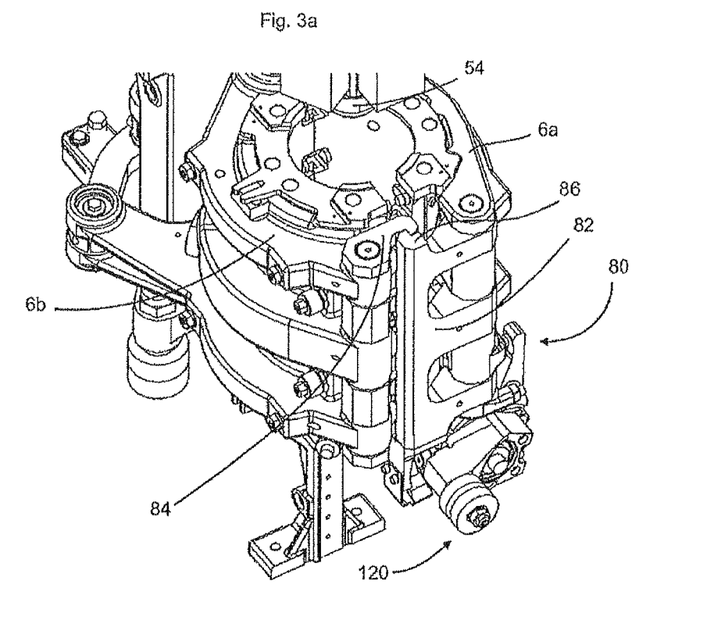
FIG. 3*a* shows a blowing station according to the prior art.

FIG. 3a shows a blowing station according to the prior art. This blowing station has a first blow mould carrier part 6a and a second blow mould carrier part 6b which can be opened and closed. Reference numeral 54 designates a blowing nozzle for expanding the plastic preforms.

A first locking element 82 is mounted pivotably on the first blow mould carrier part 6a. A second locking element 84 is arranged on the second blow mould carrier part 6b. In a closed state, the first locking element 82 engages with an engagement portion 86 in the second locking element 84.

Reference numeral 120 designates an actuation mechanism for moving the locking element.

Figure 3B:
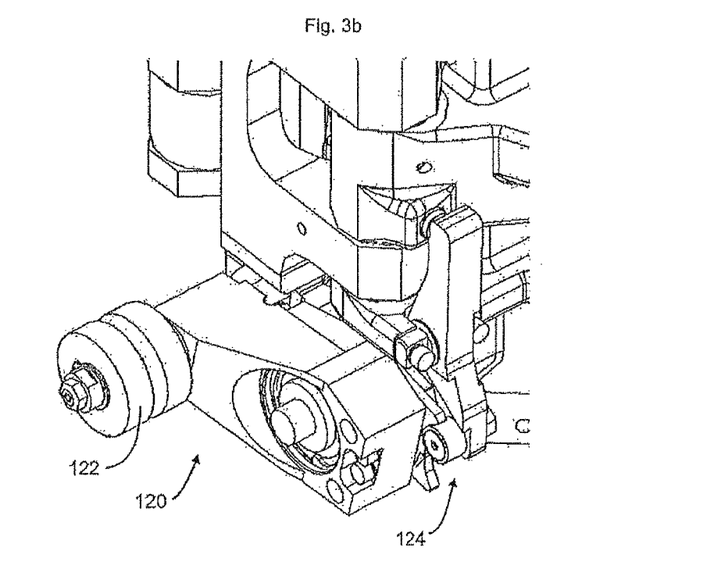
FIG. 3*b* is a detailed depiction of the apparatus shown in FIG. 3*a*.

FIG. 3b shows a detailed depiction of the apparatus shown in FIG. 3a. It is clear that the actuation mechanism 120 has a curve roller 122 which rolls in relation to a guide curve (not shown). Reference numeral 124 designates diagrammatically a catch mechanism which causes the locking element to catch either in the closed or in the open state.

Figure 4:
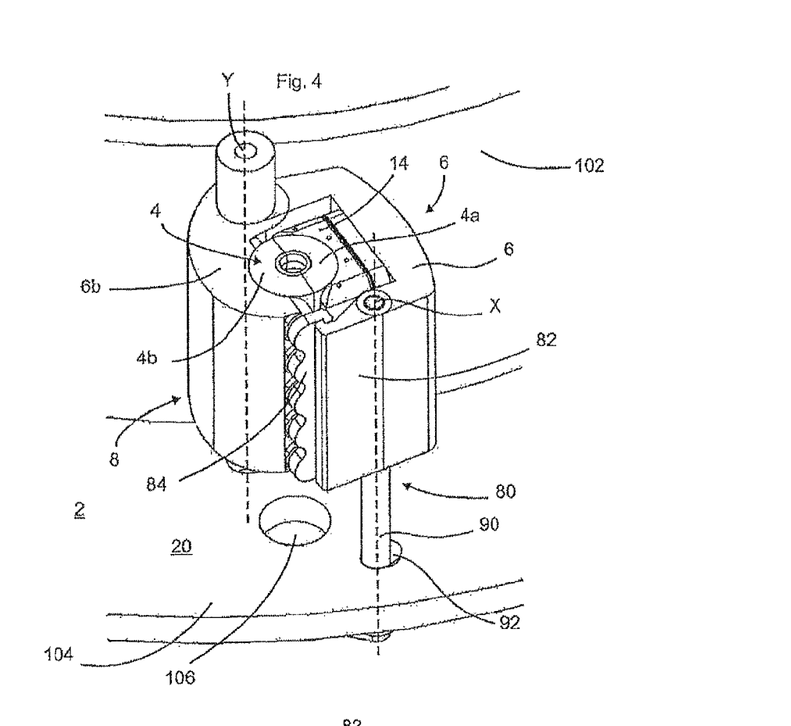
FIG. 4 is a diagrammatic depiction of a blowing station according to the invention.

FIG. 4 shows a blowing station 8 according to the invention. This blowing station 8 is arranged on the carrier 2. The carrier 2 has an inner wall 102 which at the same time forms a delimitation of the clean room. This wall 102 has a circular outer periphery.

Reference numeral 104 refers to a base wall of the carrier 2 which also forms a border of the clean room 20. In this base wall 104, an opening 106 is provided through which a mechanism can be guided with which the base mould (not shown) can be moved up to the blow mould.

The blow mould 4 has two blow mould parts 4a and 4b which, when folded together, form a cavity within which the plastic preforms are expanded by pressurization with a fluid e.g. compressed air.

The blow mould part 4a is arranged on a first blow mould carrier part 6a by means of a carrier shell 14. A pressure pad (not shown) can be provided which, when pressurized with compressed air, allows the blow mould part 4a to be pressed onto the second blow mould part 4b.

The second blow mould part 4b is arranged on a second blow mould carrier part 6b. This second blow mould carrier part 6b is pivotable about a first pivot shaft Y in order to open and close the blow mould.

A pivot shaft for pivoting the blow mould carrier part 6b can for example be mounted opposite the carrier 2, wherein advantageously corresponding bearing devices are arranged outside the clean room.

A second locking element 84 is arranged on the second blow mould carrier part 6b. A first locking element 82 is arranged on the first blow mould carrier part 6a and is pivotable about a second pivot axis X. To pivot this first locking element 82, a pivot shaft 90 is provided which is pivotable about a second pivot axis X. This pivot shaft 90 here extends through an opening 92 made in the wall 104. Reference numeral 80 designates the locking mechanism as a whole.

The first blow mould carrier part is made of stainless steel. The second blow mould carrier part 6b is made of an aluminium alloy and therefore has a lower density, but also a lower strength than the first blow mould carrier part. The high strength of stainless steel is not however necessary for the second blow mould carrier part since the pressure pad (no reference numeral) is provided between the first blow mould carrier part 6a and the carrier shell 14, and mounting the pivot shaft 90 does not require great strength. For this, the second blow mould carrier part has a low density and a low mass which allows a greater pivot angle about axis Y within a short time without overloading the control curves or curve rollers.

Figure 5A:
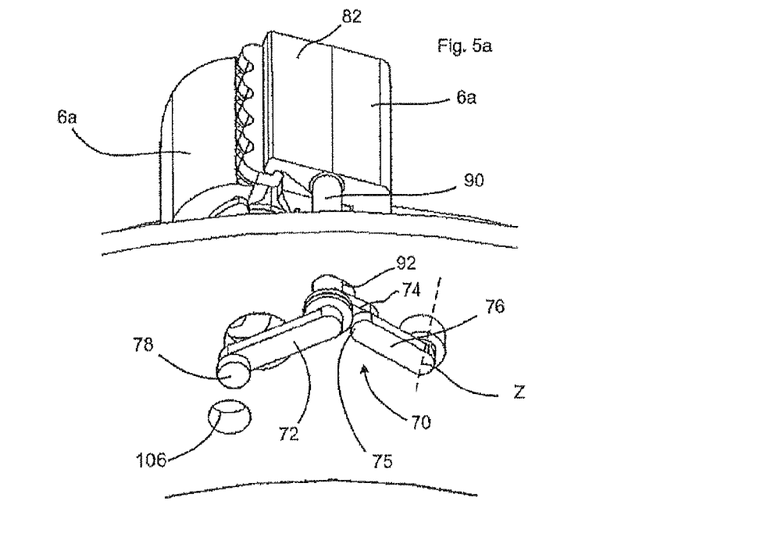
FIG. 5*a* shows the blowing station from FIG. 4 in closed state.
Figure 5B:
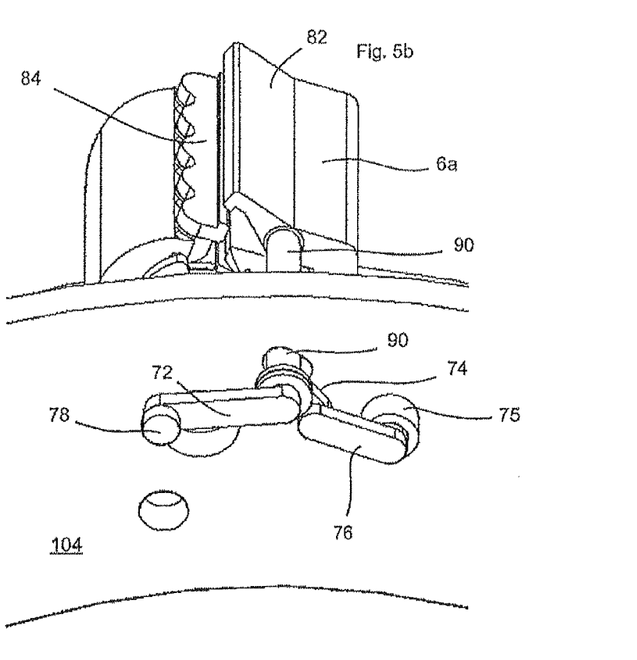
FIG. 5*b* shows the blowing station from FIG. 4 in a half-open state.
Figure 5C:
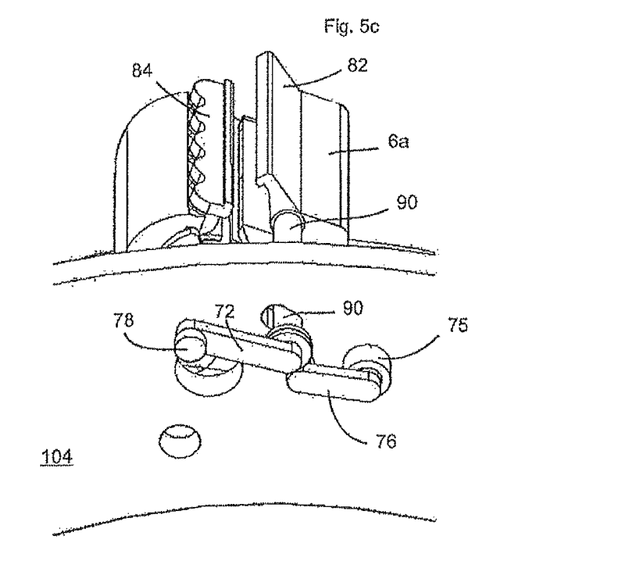
FIG. 5*c* shows the blowing station from FIG. 4 in open state.

FIGS. 5a to 5c show three views of different opening positions of a blowing station 8 according to the invention. In the situation shown in FIG. 5a, the blow mould is closed and locked. Below the wall 104 and hence preferably outside the clean room, a coupling device—designated as a whole with 70—is provided which couples a pivot movement of the first locking element 82 with a pivot movement of the first blow mould carrier part 6a. Reference numeral 72 designates a pivot lever on which a curve roller 78 is arranged which causes a pivoting of the pivot shaft 90.

By pivoting the lever 72, at the same time an arm 74 is pivoted which is connected articulatedly with a further arm 76. Reference numeral 75 designates roughly a corresponding articulated connection between the arms 74 and 76. By pivoting of the arm 74, the pivot shaft 90 is also moved in relation to the opening 92 or displaced in a direction standing perpendicular to the rotary axis X. More precisely, the pivot shaft 90 is moved along an arcuate path.

Lever 76 is arranged pivotably in relation to a third pivot axis Z on a holding device and hence advantageously on the wall 104.

The enclosed figures show only one such blowing station. Normally several of these blowing stations are arranged on an advantageously rotating carousel. As shown in FIGS. 4 and 5a to 5c, the first carrier part is mounted via the main shaft. The locking shaft is again rotatably mounted in the first mould carrier part. Hooks 86 are arranged in turn on this locking shaft 90 and when the lock is closed, cooperate or engage with corresponding locking hooks of the second blow mould carrier part 6b. As stated, the curve roller or control roller 78 is also connected with the locking shaft 90 via the lever 72. The curve roller is located in the machine advantageously below the two blow mould carrier parts 6a and 6b.

In the opening process, with the carousel rotating, the curve roller 78 is controlled by a curve (in particular arranged stationary). The locking shaft 90 rotates counterclockwise. In this way the lock between the first locking element 82 and the second locking element 84 is released. Advantageously the geometry of the lever arrangement is selected so that the first locking element is first moved almost exclusively forward, i.e. out from the centre of the station, and then quickly to the right in order to open the first blow mould carrier part 6a rapidly.

This situation is shown in FIG. 5b which shows a half-open state. The first locking element is already out of engagement with the second locking element 84, and the locking shaft 90 has moved slightly in relation to the opening 92.

As the curve roller 78 moves further, the locking shaft 90 is also turned further counterclockwise. Due to the lever 74 or locking joint 75, the entire blow mould carrier part 6a is moved counterclockwise. This situation is shown in FIG. 5c. The width of the respective opening movement can be adapted to requirements by suitable choice of lengths of element 74 and element 76. The blowing station is closed and locked in the reverse order. In the situation shown in FIG. 5c, for greater clarity the left blow mould carrier part 6b is shown in closed state. In fact at this time, this blow mould carrier part would be wide open.

The advantage of this construction is that two movements—namely the movements of the first blow mould carrier part and of the locking shaft—can be controlled with just one curve. Also it is possible to execute the movements of the two mould carrier parts independently of each other. Thus for example the movement of the mould carrier part 6a can end earlier than the movement of the second mould carrier part 6b. This is not possible in the prior art due to the normally rigid coupling of the two mould carrier parts.

Figure 6:
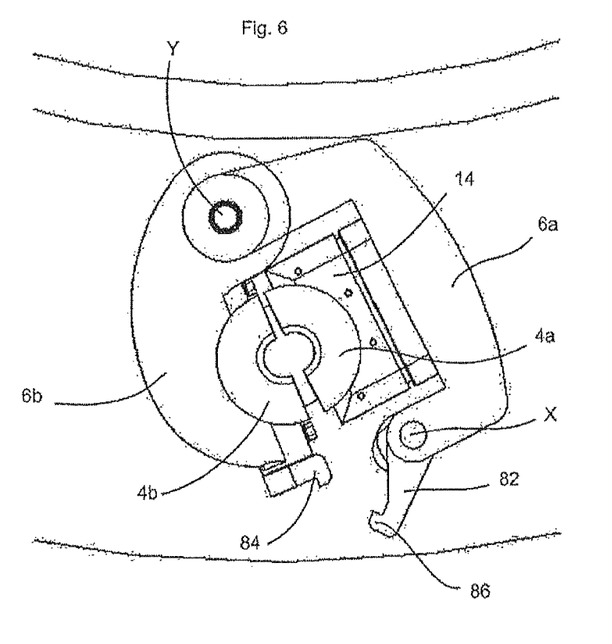
FIG. 6 is a further top view of a blowing station in an open state.

FIG. 6 shows a further top view of a blowing station according to the invention. In this situation, the locking element 82 is opened and the first blow mould carrier part 6a is opened, and hence the blow mould is also opened. For reasons of clarity, the second blow mould carrier part 6b is here shown still closed. In practice this blow mould carrier part would already be wide open at a corresponding time, in order for example to be able to remove a finished blown container or insert a plastic preform.

A connecting line for supplying tempering media to the right mould carrier parts 6a or shells 14, 4a is not shown but is present. These hoses (feed and return) extend from the wall 102 to the underside (i.e. into the image plane) of the carrier shell 14. The tempering medium then passes through a labyrinth in the carrier shell, in order to maintain a constant temperature at all possible regions of the carrier shell 14 which are in contact with the blow mould 4a. The left mould carrier also contains a labyrinth for tempering the blow mould 4b, but this labyrinth receives the tempering medium directly from the shaft Y which rotates with the blow mould carrier 6b.

It is therefore proposed that the movement of one or several mould carrier parts and the movements of the locking shaft are coupled together (in particular mechanically) via one or several levers or connecting joints or other mechanical elements.

Advantageously one blow mould carrier part 6a can move independently of the other blow mould carrier part 6b. Thus the movements of the two blow mould carrier parts can begin simultaneously or at different times, or end simultaneously or at different times. In the examples shown above, it is useful if the movements of the two mould carrier parts begin simultaneously but the movement of the first blow mould carrier part 6a ends earlier than the movement of the second blow mould carrier part 6b, since here the second blow mould carrier part 6b must describe a greater pivot movement or a greater pivot angle.

In a further advantageous embodiment, it would also be possible for the movements of both mould carrier parts 6a and 6b, and also the movement of the locking shaft, to be generated by a control system. This would for example be possible with a corresponding connection of the two mould carrier parts in the region of the main shaft. By actuating the control system, the first mould carrier part could then also be moved, and due to the movement of the first mould carrier part, the second mould carrier part 6b could also be moved. A coupling could take place for example with gear wheels or similar.

The applicant reserves the right to claim all features cited in the description as essential to the invention where novel individually or in combination in relation to the prior art.

LIST OF REFERENCE NUMERALS

1 Forming apparatus
2 Transport wheel
4 Blow mould
4a, b Blow mould parts, blow mould halves
5 Stretch rod
6 Blow mould carrier
6a First blow mould carrier part
6b Second blow mould carrier part
8 Blowing/forming stations
9 Guide curve
10 Plastic preforms
10a Containers
11 Follower device
12 Cradle
13 Base
14 (Mould) carrier shell
17 Cover
18 Further wall
19 Side wall
20 Clean room
21 Holder for cradle
22 Supply device
23 Holding device
24 Discharge device
25 Sealing device
26 Carrier
27 Further sealing device
28 Carrier for carrying a base mould
29 Holding body
30 Heating device
31 Heating element
32 Sterilisation device
34 Transport device
36 Delivery unit
37 Transport wheel
40 Filling device
42 Delivery unit
44 Transport unit
50 Plant for production of plastic containers
54 Blowing nozzle
55 Sterilisation device
70 Coupling device
72 Pivot lever
74 First arm
75 Articulated connection
76 Second arm
78 Curve roller
80 Locking mechanism
82 First locking element
84 Second locking element
86 Engagement portion
90 Pivot shaft
92 Opening
98 Sealing device
102 Inner wall
104 Base wall
106 Opening
120 Actuation mechanism
122 Curve roller
124 Catch mechanism
L Dotted line
U Non-sterile environment
X Pivot axis
Y Pivot axis
Z Third pivot axis

The invention claimed is:

1. An apparatus for forming plastic performs into plastic containers, with at least one blowing station arranged on a moving carrier, wherein the blowing station has a blow mould carrier for holding a blow mould and the blow mould carrier has a first blow mould carrier part and a second blow mould carrier part, wherein the second blow mould carrier part can be moved away from the first blow mould carrier part in order to open the blow mould for removal of a plastic container and/or for insertion of a preform, and wherein the second blow mould carrier part can be moved towards the first blow mould carrier part in order to transfer the blow mould into a closed state for forming the preform, wherein the second blow mould carrier part has a lower density and/or strength than the first blow mould carrier part.

2. The apparatus according to claim 1, wherein the mass of the second blow mould carrier part is less than that of the first blow mould carrier part.

3. The apparatus according to claim 1, wherein a distance travelled during an opening movement by the second blow mould carrier part is greater than a distance travelled by the first blow mould carrier part.

4. The apparatus according to claim 1, wherein a pivot angle covered during an opening movement by the second blow mould carrier part is greater than a pivot angle covered by the first blow mould carrier part.

5. The apparatus according to claim 1, wherein the second blow mould carrier part is pivotable in relation to the first blow mould carrier part about a first predefined pivot axis (Y) and the first blow mould carrier part is pivotable in relation to the second blow mould carrier part about a second predefined pivot axis (Y), and the first blow mould carrier part is pivotable through a first predefined pivot angle and the second blow mould carrier part is pivotable through a second predefined pivot angle, and in the fully open state of the blow mould carrier parts the second pivot angle is greater.

6. The apparatus according to claim 1, wherein both blow mould carrier parts are pivotable about a common axis (Y), wherein the first pivot axis and the second pivot axis are arranged coaxially.

7. The apparatus according to claim 1, wherein a pressure pad mechanism for clamping the blow mould halves together is present only in the first blow mould carrier part.

8. The apparatus according to claim 1, wherein a locking mechanism is provided for locking the blow mould carrier parts, wherein moving parts of the locking mechanism for locking the first blow mould carrier part against the second blow mould carrier part are arranged only on the first blow mould carrier part.

9. The apparatus according to claim 8, wherein the locking mechanism has a first locking element arranged at least indirectly on the first blow mould carrier part and a second locking element arranged at least indirectly on the second blow mould carrier part, wherein in a locked state of the blow mould carrier parts, the locking elements cooperate, wherein at least the first locking element is moveable about a second predefined axis (X) in relation to the carrier, wherein the pivot movement of the first blow mould carrier part and the movement of the first locking element are coupled together by means of a coupling device such that for at least part of the time during a movement of the first locking element about the second predefined axis (X), the second predefined axis (X) moves in relation to the carrier in a direction standing perpendicular to the second axis (X).

10. The apparatus according to claim 1, wherein the apparatus has a clean room separated from the environment (U) by at least one wall, within which at least the blow mould carrier parts are moved.

11. The apparatus according to claim 1, wherein the first blow mould carrier part, or the blow mould half arranged on the first blow mould carrier part, or an intermediate shell between the blow mould half and the blow mould carrier part, is connected to a tempering medium connection via at least one flexible line, and the second blow mould carrier part is supplied with tempering medium via lines, wherein the lines are arranged in a pivot axis (Y) associated with this blow mould carrier part.

12. A blow mould carrier for holding a blow mould, comprising a first blow mould carrier part and a second blow mould carrier part, wherein the second blow mould carrier part can be moved away from the first blow mould carrier part in order to open the blow mould for removal of a plastic container and/or for insertion of a preform, and wherein the second blow mould carrier part can be moved towards the first blow mould carrier part in order to transfer the blow mould into a closed state for forming the preform, wherein the second blow mould carrier part has a lower density and/or strength than the first blow mould carrier part.

13. The apparatus according to claim 1, wherein the first blow mould carrier part, or the blow mould half arranged on the first blow mould carrier part, or an intermediate shell between the blow mould half and the blow mould carrier part, is connected to a tempering medium connection via two flexible feed and return lines, and the second blow mould carrier part is supplied with tempering medium via lines, wherein the lines are arranged in a pivot axis (Y) associated with this blow mould carrier part.

14. The apparatus according to claim 5, wherein the second pivot angle is greater than the first pivot angle by more than 10°.

15. The apparatus according to claim 10, wherein the blow mould carrier parts and blow moulds are moved into the clean room.

* * * * *

UNITED STATES PATENT AND TRADEMARK OFFICE
CERTIFICATE OF CORRECTION

| | | |
|---|---|---|
| PATENT NO. | : 9,149,969 B2 | Page 1 of 1 |
| APPLICATION NO. | : 14/486613 | |
| DATED | : October 6, 2015 | |
| INVENTOR(S) | : Handschuh et al. | |

It is certified that error appears in the above-identified patent and that said Letters Patent is hereby corrected as shown below:

On the title page item [56], page 2, col. 2, line 15, "February 1, 2015" should read --February 11, 2015--.

In the claims

Claim 1, col. 14, line 16, "performs" should read --preforms--.

Signed and Sealed this
Tenth Day of May, 2016

Michelle K. Lee
*Director of the United States Patent and Trademark Office*